(12) United States Patent
Inoue

(10) Patent No.: US 12,448,104 B2
(45) Date of Patent: Oct. 21, 2025

(54) MARINE VESSEL MANEUVERING SYSTEM AND MARINE VESSEL

(71) Applicant: YAMAHA HATSUDOKI KABUSHIKI KAISHA, Iwata (JP)

(72) Inventor: Hiroshi Inoue, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 433 days.

(21) Appl. No.: 17/730,295

(22) Filed: Apr. 27, 2022

(65) Prior Publication Data

US 2022/0355912 A1    Nov. 10, 2022

(30) Foreign Application Priority Data

May 6, 2021    (JP) .................. 2021-078616

(51) Int. Cl.
*B63H 21/21* (2006.01)
*B60L 3/00* (2019.01)
*B60L 15/20* (2006.01)
*B63H 21/17* (2006.01)
*G08G 3/00* (2006.01)

(52) U.S. Cl.
CPC .............. *B63H 21/213* (2013.01); *B60L 3/00* (2013.01); *B60L 15/20* (2013.01); *B63H 21/17* (2013.01); *G08G 3/00* (2013.01); *B60L 2250/16* (2013.01); *B60L 2250/24* (2013.01); *B63H 2021/216* (2013.01)

(58) Field of Classification Search
CPC ........... B60L 3/00; B60L 15/20; B63H 21/17; B63H 21/213
See application file for complete search history.

(56) References Cited

U.S. PATENT DOCUMENTS 4,817,466 A * 4/1989 Kawamura .......... B63H 21/213
                                              477/107
10,124,870 B2  11/2018  Bergmann et al.
2008/0085640 A1  4/2008  Ishida et al.
(Continued)

FOREIGN PATENT DOCUMENTS

EP        1 897 802 B1    11/2016
JP        2008-087736 A    4/2008
(Continued)

OTHER PUBLICATIONS

Official Communication issued in corresponding European Patent Application No. 22171574.1, mailed on Oct. 28, 2022.

*Primary Examiner* — Anshul Sood
(74) *Attorney, Agent, or Firm* — Keating & Bennett, LLP

(57) ABSTRACT

A marine vessel maneuvering system includes a marine propulsion unit including an electric motor, an input to input a neutral command to stop the electric motor and to input a drive command to drive the electric motor, a start switch to switch a stopped state in which the electric motor is not driven to a ready-to-be-driven state in which the electric motor is ready to be driven, and a controller configured or programmed to perform a control to switch the stopped state to the ready-to-be-driven state upon a user operating the start switch when a main power supply that controls a power supply to an on-board device of a hull is in an on state, the neutral command is being input to the input, and a marine vessel is in the stopped state.

19 Claims, 4 Drawing Sheets

(56) References Cited

U.S. PATENT DOCUMENTS

| | | | |
|---|---|---|---|
| 2010/0048068 A1* | 2/2010 | Bamba | B63H 21/17 440/1 |
| 2010/0248560 A1* | 9/2010 | Ito | B63H 21/22 440/1 |
| 2012/0064783 A1* | 3/2012 | Grez | B63H 20/14 440/6 |
| 2013/0115832 A1 | 5/2013 | Suzuki et al. | |
| 2014/0106631 A1 | 4/2014 | Ito | |
| 2018/0134355 A1 | 5/2018 | Suzuki et al. | |
| 2019/0226436 A1* | 7/2019 | Sato | F02D 41/3082 |
| 2019/0344667 A1 | 11/2019 | Naito et al. | |
| 2020/0062361 A1 | 2/2020 | Nakamura | |

FOREIGN PATENT DOCUMENTS

| | | |
|---|---|---|
| JP | 2010-143321 A | 7/2010 |
| JP | 2011-213241 A | 10/2011 |
| JP | 2014-080082 A | 5/2014 |
| JP | 2014-172518 A | 9/2014 |
| JP | 2018-079743 A | 5/2018 |
| JP | 2019-196132 A | 11/2019 |

* cited by examiner

MARINE VESSEL MANEUVERING SYSTEM AND MARINE VESSEL

CROSS REFERENCE TO RELATED APPLICATIONS

This application claims the benefit of priority to Japanese Patent Application No. 2021-078616 filed on May 6, 2021. The entire contents of this application are hereby incorporated herein by reference.

BACKGROUND OF THE INVENTION

1. Field of the Invention

The present invention relates to a marine vessel maneuvering system and a marine vessel.

2. Description of the Related Art

In recent years, as a means to solve the problems of climate change and global warming toward sustainable development goals (so-called SDGs), activities have been promoted to reduce carbon dioxide emissions by engine electrification, for example. A marine vessel maneuvering system and a marine vessel each including a marine propulsion unit that drives a propeller with an electric motor are known in general, for example. Such a marine vessel maneuvering system is disclosed in Japanese Patent Laid-Open No. 2011-213241, for example.

Japanese Patent Laid-Open No. 2011-213241 discloses an electric outboard motor system including an electric outboard motor that drives a propeller with an electric motor, and a main switch. An external device such as a management unit that maintains the electric outboard motor system is connected to the electric outboard motor system. When the main switch is turned on, the electric outboard motor system and the external device are activated, and the electric outboard motor system is ready to drive the electric motor. That is, the electric motor is ready to be driven.

Even when the main switch is turned on such that the electric outboard motor system disclosed in Japanese Patent Laid-Open No. 2011-213241 is ready to drive the electric motor, the electric motor does not emit a driving sound such as an engine sound, and thus a user is not able to recognize whether or not the electric motor is ready to be driven, using the sound as a clue. Therefore, it is conventionally desired to allow the user to recognize that the electric motor is ready to be driven and drive the propeller with the electric motor with a clear intention.

SUMMARY OF THE INVENTION

Preferred embodiments of the present invention provide marine vessel maneuvering systems and marine vessels that each allow users to recognize that electric motors are ready to be driven and drive propellers with the electric motors with clear intentions.

A marine vessel maneuvering system according to a preferred embodiment of the present invention includes a marine propulsion unit including an electric motor to drive a propeller, an input to input a neutral command to stop the electric motor and to input a drive command to drive the electric motor, a start switch to receive an operation to switch a stopped state in which the electric motor is not driven to a ready-to-be-driven state in which the electric motor is ready to be driven, and a controller configured or programmed to perform a control to switch the stopped state to the ready-to-be-driven state to allow the electric motor to drive the propeller upon a user operating the start switch when a main power supply that controls a power supply to an on-board device of a hull is in an on state, the neutral command is being input to the input, and a marine vessel is in the stopped state.

A marine vessel maneuvering system according to a preferred embodiment of the present invention includes the controller configured or programmed to perform a control to switch the stopped state to the ready-to-be-driven state to allow the electric motor to drive the propeller upon the user operating the start switch when the main power supply that controls a power supply to the on-board device of the hull is in the on state, the neutral command is being input to the input, and the marine vessel is in the stopped state. Accordingly, the stopped state is switched to the ready-to-be-driven state in which the electric motor is ready to be driven upon the user operating the start switch when the main power supply that controls a power supply to the on-board device of the hull is in the on state. Thus, in the marine vessel maneuvering system, the user is requested to perform a dedicated operation (an operation on the start switch) only to allow driving of the electric motor. Consequently, the user recognizes that the electric motor is ready to be driven, and drives the propeller with the electric motor with a clear intention.

In a marine vessel maneuvering system according to a preferred embodiment of the present invention, the controller is preferably configured or programmed to perform a control to maintain the stopped state upon the user operating the start switch when the drive command is being input to the input in the stopped state. Accordingly, when the drive command to drive the electric motor is being input to the input in the stopped state in which the electric motor is not driven, the drive command has already been input to the input, and thus the stopped state is maintained without switching to the ready-to-be-driven state even when the start switch is operated. Thus, driving of the electric motor is prevented from being started immediately after the start switch is operated. That is, an operation on the input, and not an operation on the start switch, is the final trigger to drive the electric motor.

A marine vessel maneuvering system according to a preferred embodiment of the present invention preferably further includes a neutral retention switch to receive an operation to maintain a state in which the neutral command is being transmitted to the electric motor, and the controller is preferably configured or programmed to perform a control to not drive the electric motor regardless of an input to the input upon the user operating the neutral retention switch when the neutral command is being input to the input, and the start switch has been operated to switch the marine vessel to the ready-to-be-driven state. Accordingly, even in the ready-to-be-driven state, the state in which the electric motor is not driven is maintained by the neutral retention switch regardless of an input to the input.

A marine vessel maneuvering system according to a preferred embodiment of the present invention preferably further includes an emergency stop switch to acquire a user's movement that triggers an emergency stop of the propeller and switch the ready-to-be-driven state to the stopped state, and the controller is preferably configured or programmed to perform a control to return the stopped state to the ready-to-be-driven state upon the user operating the start switch with the neutral command being input to the input when the marine vessel is switched to the stopped state by the emergency stop switch. Accordingly, the stopped state is released by operating the start switch when the neutral command is being input to the input, and not when the drive command is being input to the input. Therefore, the electric motor is prevented from being driven immediately when the stopped state is released.

A marine vessel maneuvering system according to a preferred embodiment of the present invention preferably further includes a notifier to notify the user that the marine vessel has changed from the stopped state to the ready-to-be-driven state. Accordingly, the notifier allows the user to easily recognize that the marine vessel has changed from the stopped state to the ready-to-be-driven state.

In such a case, the notifier preferably includes a lamp that is off when the marine vessel is in the stopped state and is on when the marine vessel is in the ready-to-be-driven state. Accordingly, the user visually recognizes that the marine vessel has changed from the stopped state to the ready-to-be-driven state. Therefore, the user more easily recognizes that the marine vessel has changed from the stopped state to the ready-to-be-driven state.

In a marine vessel maneuvering system including the notifier, the notifier preferably includes a display to indicate that the marine vessel is in the stopped state or the ready-to-be-driven state. Accordingly, the display allows the user to more reliably visually recognize information indicating that the marine vessel is in the stopped state or the ready-to-be-driven state.

In such a case, the controller is preferably configured or programmed to perform a control to maintain the stopped state upon the user operating the start switch when the drive command is being input to the input in the stopped state, and the display preferably displays a predetermined notification regarding the stopped state when the user operates the start switch but the stopped state is maintained. Accordingly, when the stopped state is maintained although the user operates the start switch with the intention to change the stopped state to the ready-to-be-driven state, the predetermined notification regarding the stopped state is displayed on the display for the user. This predetermined notification allows the user to perform an appropriate operation to change the stopped state to the ready-to-be-driven state.

A marine vessel maneuvering system according to a preferred embodiment of the present invention preferably further includes a power switch to receive an operation to switch on and off states of the main power supply, and an operation panel including both the start switch and the power switch. Accordingly, the power switch and the start switch are provided on the common operation panel, and thus the power switch and the start switch are easily continuously operated when the propeller is to be driven while the main power supply is in the off state. That is, the operability of the marine vessel maneuvering system is improved.

In a marine vessel maneuvering system according to a preferred embodiment of the present invention, the start switch preferably receives an operation to switch the ready-to-be-driven state to the stopped state in addition to receiving the operation to switch the stopped state to the ready-to-be-driven state. Accordingly, the start switch receives not only an operation (start operation) to switch the stopped state to the ready-to-be-driven state but also an operation (stop operation) to switch the ready-to-be-driven state to the stopped state. Therefore, the system structure is simplified as compared with a case in which a separate dedicated switch is provided for each of these operations.

In a marine vessel maneuvering system according to a preferred embodiment of the present invention, the start switch is preferably a button switch that is operated by being pressed. Accordingly, the stopped state is easily switched to the ready-to-be-driven state by the start switch, which is a button switch.

In a marine vessel maneuvering system according to a preferred embodiment of the present invention, when the start switch is operated to switch the stopped state to the ready-to-be-driven state, an input to the input is preferably switched from the neutral command to the drive command such that the electric motor starts driving the propeller. Accordingly, the user who operates the start switch operates the input to start driving the propeller. That is, the user having a clear intention to drive the propeller with the electric motor operates the input to start driving the propeller.

In a marine vessel maneuvering system according to a preferred embodiment of the present invention, the input preferably includes a lever, and is preferably a remote control lever that switches a position of the remote control lever from a neutral input position at which the neutral command is input to the input to a drive input position at which the remote control lever is tilted such that the drive command is input to the input, and the remote control lever preferably increases a rotation speed of the electric motor as a tilt angle of the remote control lever increases, and includes a dead zone in which the rotation speed of the electric motor is maintained at zero when the remote control lever is within a predetermined tilt angle range including the neutral input position. Accordingly, the dead zone prevents the electric motor from being driven at a low rotation speed at which the thrust of the propeller is hardly obtained even when the electric motor is driven.

In such a case, the remote control lever preferably includes a neutral notch to stop and hold the remote control lever at the neutral input position, and a drive notch provided at a boundary position between the dead zone and a sensing region corresponding to the drive input position to stop and hold the remote control lever at the drive input position such that the rotation speed of the electric motor becomes a predetermined minimum drive rotation speed. Accordingly, the neutral notch allows the remote control lever to be easily held at the neutral input position such that the rotation speed of the electric motor becomes zero. Furthermore, the drive notch allows the remote control lever to be easily held at the drive input position such that the rotation speed of the electric motor becomes the minimum drive rotation speed at which the thrust of the propeller is obtained.

A marine vessel according to a preferred embodiment of the present invention includes a hull, and a marine vessel maneuvering system mounted on the hull. The marine vessel maneuvering system includes a marine propulsion unit including an electric motor to drive a propeller, an input to input a neutral command to stop the electric motor and to input a drive command to drive the electric motor, a start switch to receive an operation to switch a stopped state in which the electric motor is not driven to a ready-to-be-driven state in which the electric motor is ready to be driven, and a controller configured or programmed to perform a control to switch the stopped state to the ready-to-be-driven state to allow the electric motor to drive the propeller upon a user operating the start switch when a main power supply that controls a power supply to an on-board device of the hull is in an on state, the neutral command is being input to the input, and the marine vessel is in the stopped state.

A marine vessel according to a preferred embodiment of the present invention includes the controller configured or programmed to perform a control to switch the stopped state to the ready-to-be-driven state to allow the electric motor to drive the propeller upon the user operating the start switch when the main power supply that controls a power supply to the on-board device of the hull is in the on state, the neutral command is being input to the input, and the marine vessel is in the stopped state. Accordingly, the stopped state is switched to the ready-to-be-driven state in which the electric motor is ready to be driven upon the user operating the start switch when the main power supply that controls a power supply to the on-board device of the hull is in the on state. Thus, in the marine vessel maneuvering system, the user is requested to perform a dedicated operation (an operation on the start switch) only to allow driving of the electric motor. Consequently, the user recognizes that the electric motor is ready to be driven, and drives the propeller with the electric motor with a clear intention.

In a marine vessel according to a preferred embodiment of the present invention, the controller is preferably configured or programmed to perform a control to maintain the stopped state upon the user operating the start switch when the drive command is being input to the input in the stopped state. Accordingly, when the drive command to drive the electric motor is being input to the input in the stopped state in which the electric motor is not driven, the drive command has already been input to the input, and thus the stopped state is maintained without switching to the ready-to-be-driven state even when the start switch is operated. Thus, driving of the electric motor is prevented from being started immediately after the start switch is operated. That is, an operation on the input, and not an operation on the start switch, is the final trigger to drive the electric motor.

In a marine vessel according to a preferred embodiment of the present invention, the marine vessel maneuvering system preferably further includes a neutral retention switch to receive an operation to maintain a state in which the neutral command is being transmitted to the electric motor, and the controller is preferably configured or programmed to perform a control to not drive the electric motor regardless of an input to the input upon the user operating the neutral retention switch when the neutral command is being input to the input, and the start switch has been operated to switch the marine vessel to the ready-to-be-driven state. Accordingly, even in the ready-to-be-driven state, the state in which the electric motor is not driven is maintained by the neutral retention switch regardless of an input to the input.

In a marine vessel according to a preferred embodiment of the present invention, the marine vessel maneuvering system preferably further includes an emergency stop switch to acquire a user's movement that triggers an emergency stop of the propeller and switch the ready-to-be-driven state to the stopped state, and the controller is preferably configured or programmed to perform a control to return the stopped state to the ready-to-be-driven state upon the user operating the start switch with the neutral command being input to the input when the marine vessel is switched to the stopped state by the emergency stop switch. Accordingly, the stopped state is released by operating the start switch when the neutral command is being input to the input, and not when the drive command is being input to the input. Therefore, the electric motor is prevented from being driven immediately when the stopped state is released.

In a marine vessel according to a preferred embodiment of the present invention, the marine vessel maneuvering system preferably further includes a notifier to notify the user that the marine vessel has changed from the stopped state to the ready-to-be-driven state. Accordingly, the notifier allows the user to easily recognize that the marine vessel has changed from the stopped state to the ready-to-be-driven state.

In such a case, the notifier preferably includes a lamp that is off when the marine vessel is in the stopped state and is on when the marine vessel is in the ready-to-be-driven state. Accordingly, the user visually recognizes that the marine vessel has changed from the stopped state to the ready-to-be-driven state. Therefore, the user more easily recognizes that the marine vessel has changed from the stopped state to the ready-to-be-driven state.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

Figure 1:
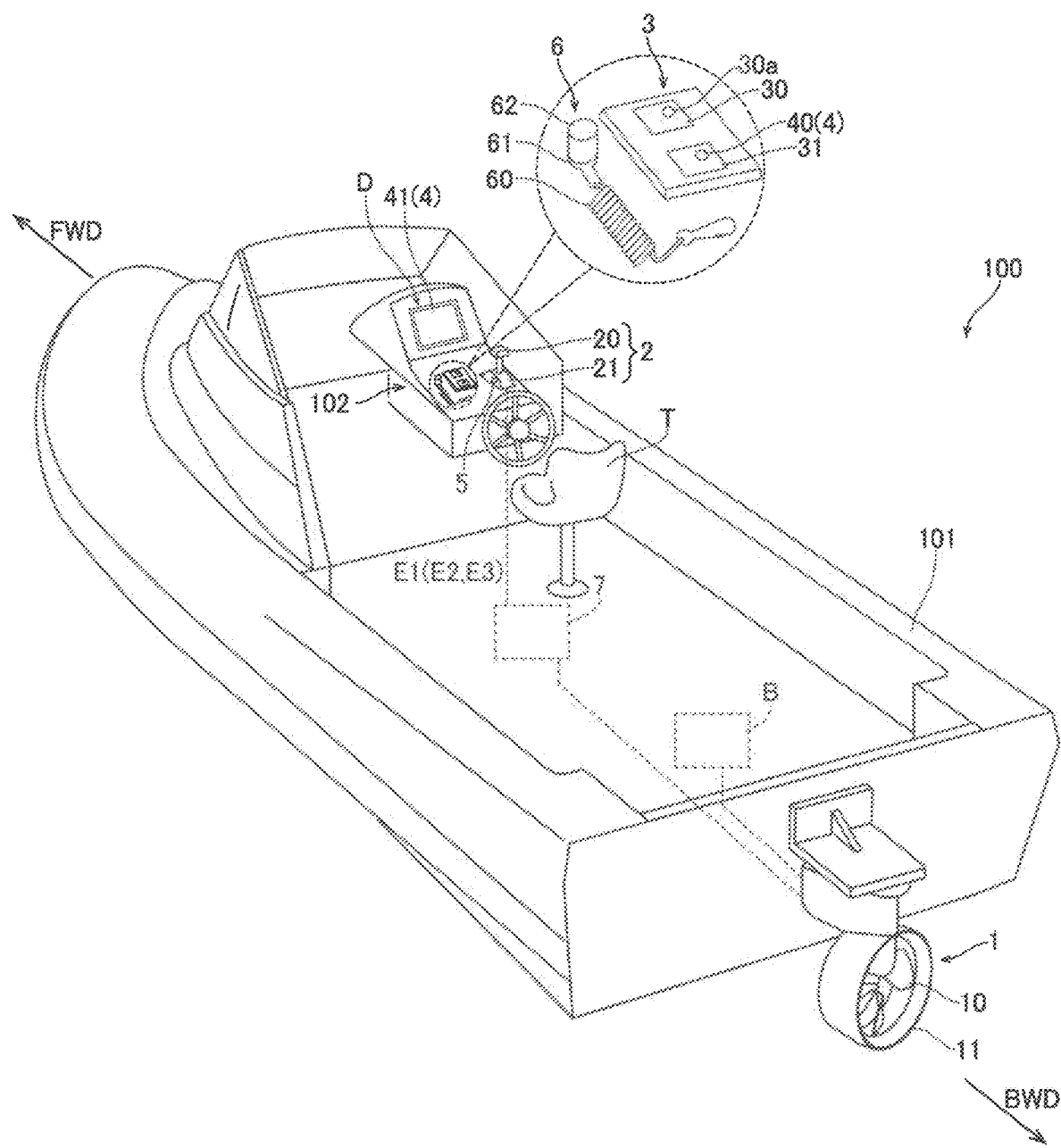
FIG. 1 is a perspective view showing a marine vessel including a marine vessel maneuvering system according to a preferred embodiment of the present invention.

The structure of a marine vessel 100 including a marine vessel maneuvering system 102 according to preferred embodiments of the present invention is now described with reference to FIGS. 1 to 6. In FIG. 1, arrow FWD represents the forward movement direction of the marine vessel 100, and arrow BWD represents the reverse movement direction of the marine vessel 100.

As shown in FIG. 1, the marine vessel 100 includes a hull 101 and the marine vessel maneuvering system 102 mounted on the hull 101. The marine vessel maneuvering system 102 includes an electric marine propulsion unit 1 installed on the transom of the hull 101. The marine vessel 100 is an outboard motor boat including the marine propulsion unit 1 installed outside the hull 101.

The marine vessel 100 limits driving of an electric motor 12 (see FIG. 2), which is a drive source of a propeller 10, such that the propeller 10 of the electric marine propulsion unit 1 is not driven only by operating a power switch 30 at the start of navigation.

At the start of navigation, the power switch 30 is operated (pressed) and then a start switch 31 is operated (pressed) such that the marine vessel 100 is able to drive the propeller 10 with the electric motor 12. That is, at the start of navigation, the power switch 30 is operated (pressed) and then the start switch 31 is operated (pressed) such that the marine vessel 100 switches from a stopped state in which the electric motor 12 is not driven to a ready-to-be-driven state in which the electric motor 12 is ready to be driven. The ready-to-be-driven state refers to a state in which the marine vessel 100 is ready to be moved forward or reversely by driving of the electric motor 12.

The power switch 30 receives an operation to switch the on and off states of a main power supply that controls a power supply to an on-board device D of the hull 101. The on-board device D is a power-driven device, and includes various devices such as a display 41, an input 2, and the marine propulsion unit 1, which are described below. When the power switch 30 is operated to turn on the main power supply, power is supplied from a battery B to the on-board device D. The battery B includes a battery dedicated to the marine propulsion unit 1 and various batteries such as a house battery.

Figure 2:
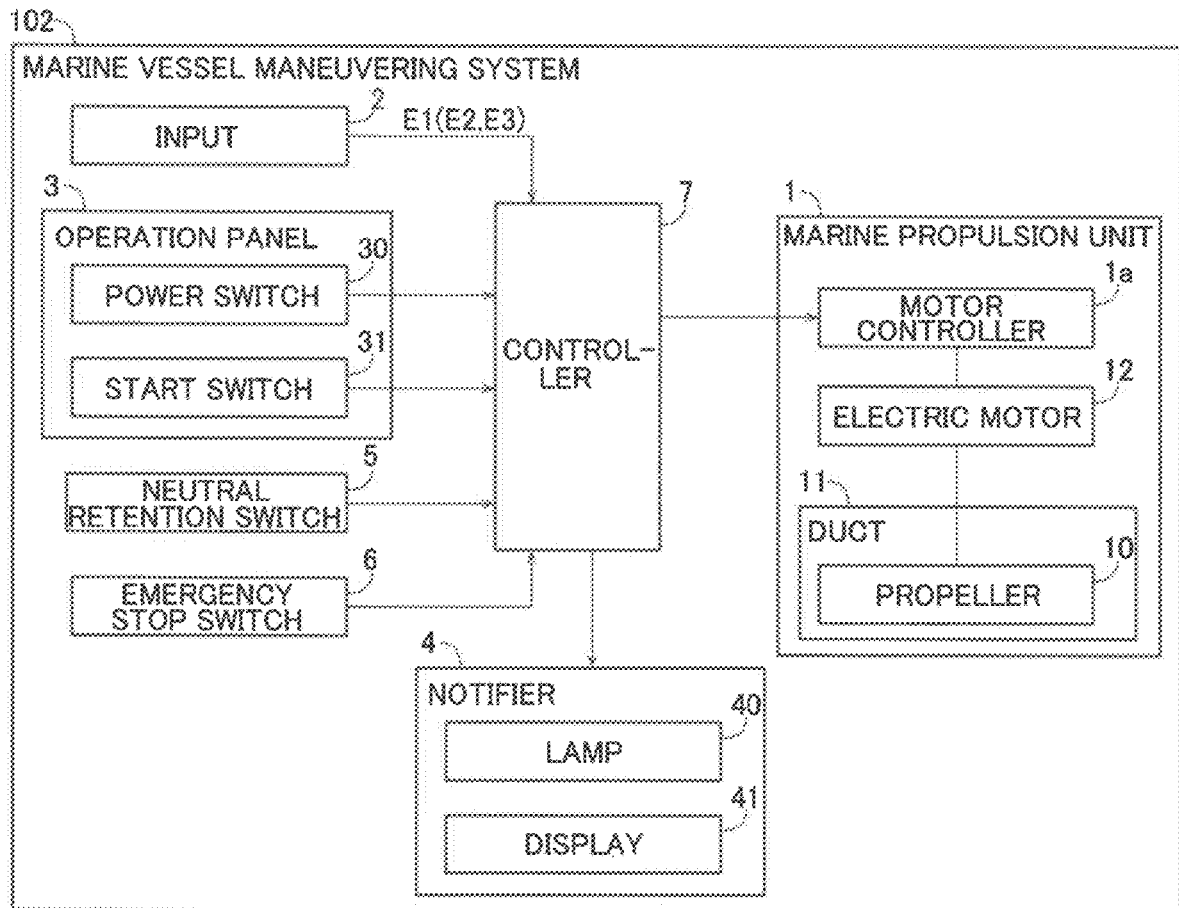
FIG. 2 is a block diagram of a marine vessel maneuvering system according to a preferred embodiment of the present invention.

As shown in FIG. 2, the marine vessel maneuvering system 102 includes a marine propulsion unit 1, an input 2, an operation panel 3 including the power switch 30 and the start switch 31, a notifier 4, a neutral retention switch 5, an emergency stop switch 6, and a controller 7. The controller 7 is connected to each of the marine propulsion unit 1, the input 2, the operation panel 3, the notifier 4, the neutral retention switch 5, and the emergency stop switch 6 by a signal line.

The electric marine propulsion unit 1 includes a duct 11 including the propeller 10 and the electric motor 12 to drive the propeller 10.

The duct 11 is rotatable in a right-left direction together with the propeller 10 in order to change the traveling direction of the marine vessel 100. The electric motor 12 freely changes the rotation speed of the propeller 10.

The electric motor 12 changes the rotation direction of the propeller 10. When the electric motor 12 rotates in a forward direction, the propulsion direction of the marine vessel 100 becomes forward, and when the electric motor 12 rotates in a reverse direction, the propulsion direction of the marine vessel 100 becomes rearward.

Specifically, when a forward drive command E2 to drive the electric motor 12 (propeller 10) in the forward direction is input to the input 2, the marine vessel 100 moves forward. When a reverse drive command E3 to drive the electric motor 12 (propeller 10) in the reverse direction is input to the input 2, the marine vessel 100 moves rearward. Driving of the electric motor 12 is controlled by a motor controller 1a provided in the marine propulsion unit 1. The forward drive command E2 and the reverse drive command E3 are examples of a "drive command".

The input 2 allows a neutral command E1 to stop the electric motor 12, the forward drive command E2 to drive the electric motor 12 in the forward direction, and the reverse drive command E3 to drive the electric motor 12 in the reverse direction to be input thereto. The input 2 is operated by a user. The neutral command E1, the forward drive command E2, and the reverse drive command E3 are transmitted from the input 2 to the controller 7 as electrical signals.

Figure 3:
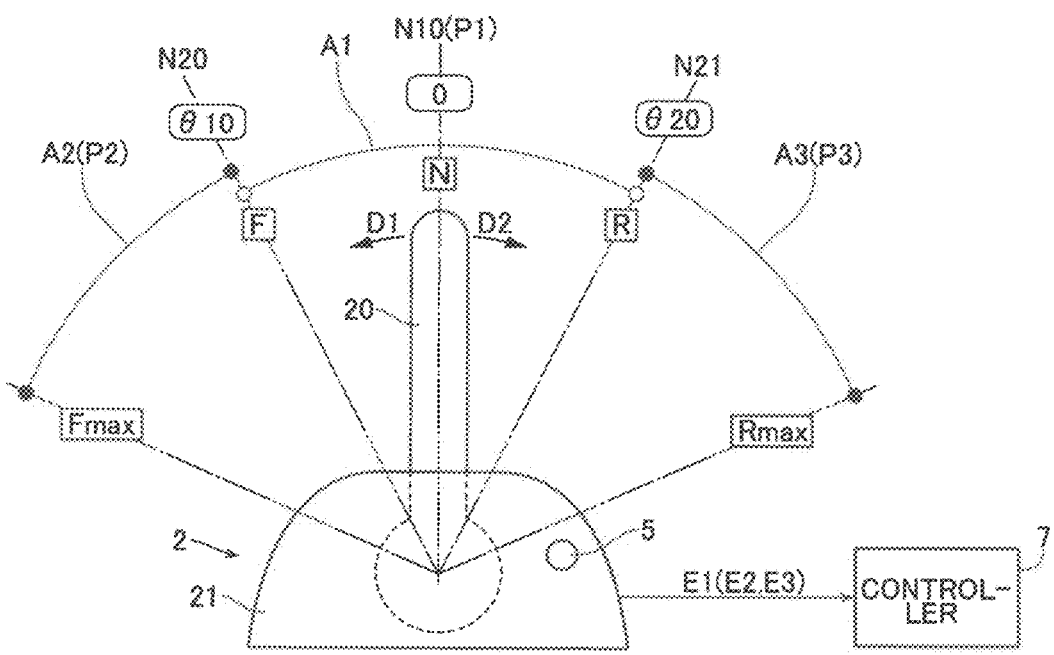
FIG. 3 is a diagram illustrating an input of a marine vessel maneuvering system according to a preferred embodiment of the present invention.

As shown in FIG. 3, the input 2 includes a lever 20 and an input main body 21 that supports the lever 20 such that the lever 20 is tiltable.

The input 2 is a remote control lever that switches the position of the lever 20 from a neutral input position P1 at which the neutral command E1 is input to the input 2 to a forward drive input position P2 or a reverse drive input position P3. The forward drive input position P2 and the reverse drive input position P3 are examples of a "drive input position".

At the forward drive input position P2, the lever 20 is tilted forward (in a D1 direction) from the neutral input position P1, and the forward drive command E2 is input to the input 2. At the reverse drive input position P3, the lever 20 is tilted rearward (in a D2 direction) from the neutral input position P1, and the reverse drive command E3 is input to the input 2.

At the neutral input position P1, the lever 20 extends in a vertical direction. That is, at the neutral input position P1, the tilt angle of the lever 20 is 0 degrees. When the lever 20 is tilted forward (in the D1 direction), the tilt angle of the lever 20 becomes a positive value, and when the lever 20 is tilted rearward (in the D2 direction), the tilt angle of the lever 20 becomes a negative value.

The input 2 increases the rotation speed of the electric motor 12 as the amount of forward or rearward tilt of the lever 20 (the absolute value of the tilt angle) increases. The input 2 includes a dead zone A1 in which the rotation speed of the electric motor 12 is maintained at zero when the lever 20 is within a predetermined tilt angle range including the neutral input position P1 (see FIG. 4).

The "predetermined tilt angle range" refers to an angle range larger than the tilt angle $\theta 20$ of the lever 20 located at a drive notch N21 and smaller than the tilt angle $\theta 10$ of the lever 20 located at a drive notch N20, as described below ($\theta 20$<predetermined tilt angle range<$\theta 10$).

The input 2 includes a neutral notch N10 that stops and holds the lever 20 at the neutral input position P1.

The input 2 includes the drive notch N20 at a boundary position between the dead zone A1 and a sensing region A2 corresponding to the forward drive input position P2. The drive notch N20 stops and holds the lever 20 at the forward drive input position P2 such that the rotation speed of the electric motor 12 becomes a predetermined minimum drive rotation speed.

The input 2 includes the drive notch N21 at a boundary position between the dead zone A1 and a sensing region A3 corresponding to the reverse drive input position P3. The drive notch N21 stops and holds the lever 20 at the reverse drive input position P3 such that the rotation speed of the electric motor 12 becomes the predetermined minimum drive rotation speed.

Figure 4:
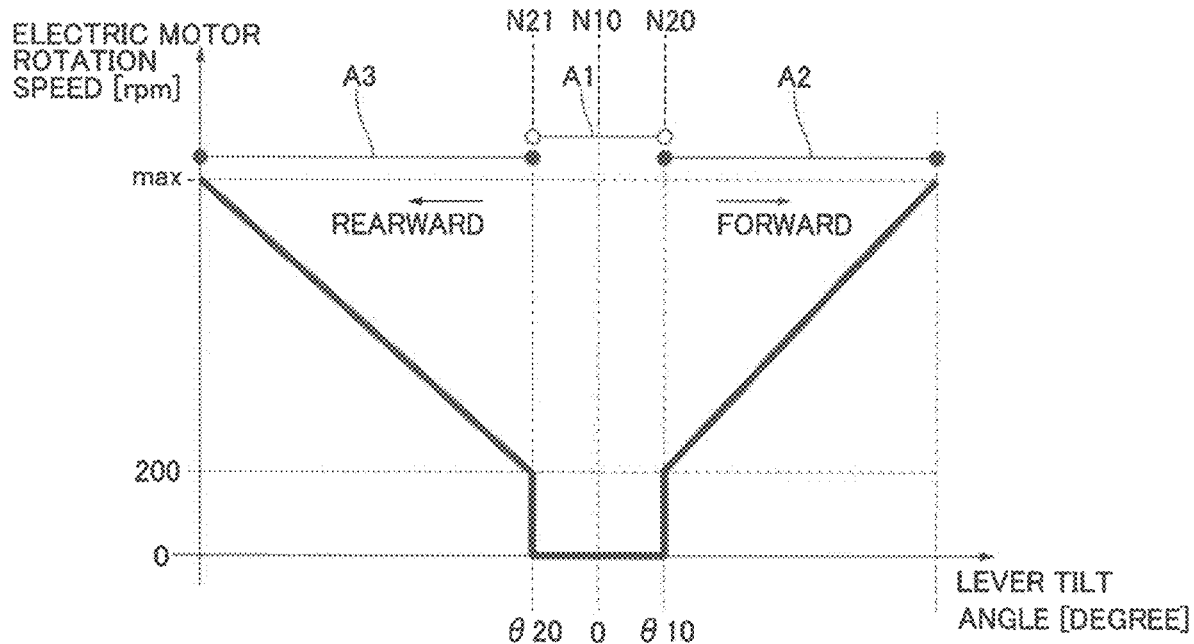
FIG. 4 is a diagram showing a relationship between the tilt angle of a lever of an input and the rotation speed of an electric motor.
Figure 5:
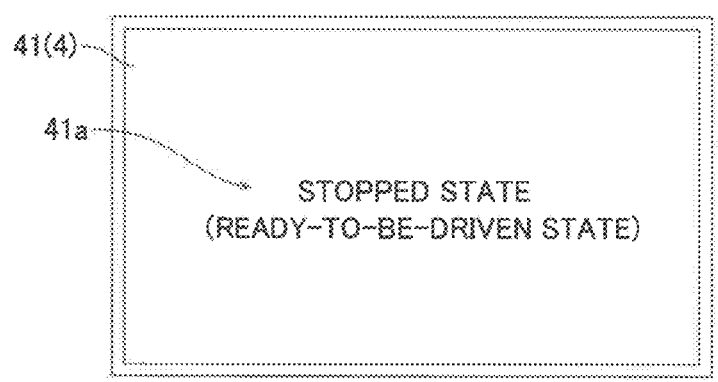
FIG. 5 is a diagram showing an indication of "STOPPED STATE (READY-TO-BE-DRIVEN STATE)" on a display of a marine vessel maneuvering system according to a preferred embodiment of the present invention.
Figure 6:
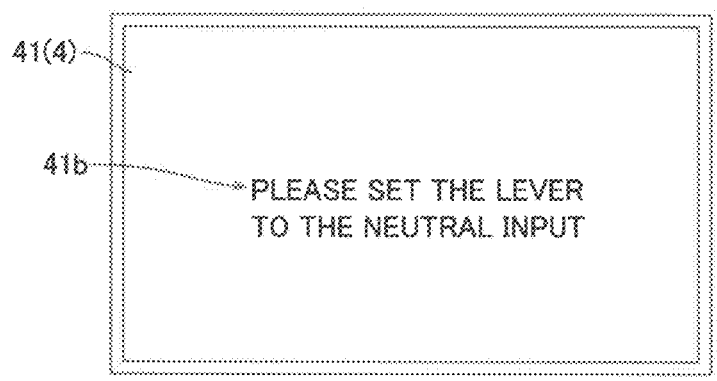
FIG. 6 is a diagram showing an indication of "PLEASE SET THE LEVER TO THE NEUTRAL INPUT POSITION" on a display of a marine vessel maneuvering system according to a preferred embodiment of the present invention.

As an example, the predetermined minimum drive rotation speed is 200 rpm (see FIG. 4). The input 2 is able to change the predetermined minimum drive rotation speed.

As shown in FIG. 3, both the power switch 30 and the start switch 31 are provided in the vicinity of or adjacent to each other on the operation panel 3. The operation panel 3 is provided in front of a maneuvering seat T on which the user sits such that the user easily sees the operation panel 3.

The power switch 30 is a button switch operated by being pressed. As described above, the power switch 30 receives an operation to switch the on and off states of the main power supply that controls a power supply to the on-board device D of the hull 101. In the marine vessel 100, the main power supply is alternately turned on and off each time the power switch 30 is pressed. The power switch 30 is provided in the vicinity of or adjacent to the start switch 31.

The power switch 30 is integral and unitary with a lamp 30a. That is, the power switch 30 includes the lamp 30a at a position pressed by the user. The lamp 30a is turned on when the power switch 30 is pressed and the main power supply is turned on. The lamp 30a is turned off when the power switch 30 is pressed and the main power supply is turned off. As an example, the lamp 30a includes an LED.

The start switch 31 is a button switch operated by being pressed. The start switch 31 becomes operable when the power switch 30 is operated and the main power supply is turned on. The start switch 31 does not receive an operation when the main power supply is turned off by the power switch 30.

The start switch 31 receives an operation (start operation) to switch the stopped state in which the electric motor 12 is not driven to the ready-to-be-driven state in which the electric motor 12 is ready to be driven. Furthermore, the start switch 31 receives an operation (stop operation) to switch the ready-to-be-driven state to the stopped state. The marine vessel 100 alternately switches between the stopped state and the ready-to-be-driven state each time the start switch 31 is pressed.

When the marine vessel maneuvering system 102 is changed from the stopped state to the ready-to-be-driven state by an operation on the start switch 31, an input to the input 2 is switched from the neutral command E1 to the forward drive command E2 or the reverse drive command E3 such that the electric motor 12 starts driving the propeller 10. That is, an operation on the input 2, and not an operation on the start switch 31, is the final trigger to drive the electric motor 12.

The notifier 4 notifies the user that the marine vessel 100 has changed from the stopped state to the ready-to-be-driven state. The notifier 4 includes a lamp 40 and a display 41.

The lamp 40 is integral and unitary with the start switch 31. That is, the start switch 31 includes the lamp 40 at a position pressed by the user. The lamp 40 is off when the marine vessel 100 is in the stopped state and is on when the marine vessel 100 is in the ready-to-be-driven state. As an example, the lamp 40 includes an LED.

The display 41 indicates that the marine vessel 100 is in the stopped state or the ready-to-be-driven state. As an example, the display 41 displays characters 41a of "STOPPED STATE" or "READY-TO-BE-DRIVEN STATE" when the marine vessel 100 is in the stopped state or the ready-to-be-driven state (see FIG. 5). As an example, the display 41 includes a liquid crystal panel.

The display 41 displays a predetermined notification 41b regarding the stopped state when the start switch 31 is operated but the stopped state is maintained. A case in which the start switch 31 is operated but the stopped state is maintained refers to a case in which the start switch 31 is operated when the drive command (the forward drive command E2 or the reverse drive command E3) is being input to the input 2 while the marine vessel 100 is in the stopped state. As an example, the display 41 displays the predetermined notification 41b, such as "PLEASE SET THE LEVER TO THE NEUTRAL INPUT POSITION", to prompt the user to perform an appropriate operation (see FIG. 6). In addition to this, the display may display characters such as "MAINTAIN A STOPPED STATE" or "THE PREVIOUS OPERATION ON THE START SWITCH IS AN ERRONEOUS OPERATION" as the predetermined notification.

The neutral retention switch 5 shown in FIG. 1 receives a user's operation to maintain a state in which the neutral command E1 is being transmitted to the electric motor 12 (neutral retention state). When the neutral retention switch 5 is operated, the neutral retention state is set, and the electric motor 12 is not driven regardless of an operation on the input 2. The neutral retention state is released when the neutral retention switch 5 is operated again in the neutral retention state.

That is, in the marine vessel 100, even when the lever 20 is switched from the neutral input position P1 to the forward drive input position P2 (or the reverse drive input position P3), the state in which the neutral command E1 is being transmitted to the electric motor 12 (neutral retention state) is maintained, and the electric motor 12 is not driven.

The neutral retention switch 5 is a button switch operated by being pressed. The marine vessel 100 alternately switches between the neutral retention state and a state in which the neutral retention state is released each time the neutral retention switch 5 is pressed. As an example, the neutral retention switch 5 is provided on the input main body 21 of the input 2.

The emergency stop switch 6 shown in FIG. 1 acquires a user's movement that triggers an emergency stop of the propeller 10 and switches the ready-to-be-driven state to the stopped state. As an example, the user's movement is a movement of the user moving to outside of an area in which the user operates the marine vessel 100 due to, for example, the user falling into the water.

The emergency stop switch 6 includes a lanyard 60, a first end of which is connected to the user's body including the user's wear, a clip 61 provided at a second end of the lanyard 60, and a switch to which the clip 61 is detachably attached.

The switch 62 is held in an off state with the clip 61 being attached thereto. When the clip 61 is detached from the switch 62 due to the user falling into the water, for example, the switch 62 switches from the off state to an on state and causes an emergency stop of the propeller 10. The propeller 10 does not start being driven only by reattaching the clip 61 to the switch 62 during the emergency stop of the propeller 10.

The controller 7 shown in FIGS. 1 and 2 includes a circuit board including a central processing unit (CPU), a read-only memory (ROM), a random access memory (RAM), etc., for example. The controller 7 is provided in the hull 101.

The controller 7 performs a control to switch the stopped state (stopped mode) to the ready-to-be-driven state (ready-to-be-driven mode) and allow the electric motor 12 to drive the propeller 10 upon the user operating the start switch 31 when the main power supply that controls a power supply to the on-board device D of the hull 101 is in an on state, the neutral command E1 is being input to the input 2, and the marine vessel 100 is in the stopped state (stopped mode).

In short, the controller 7 performs a control to switch between a state in which driving of the propeller 10 is restricted such that the propeller 10 is not driven and a state in which driving of the propeller 10 is not restricted when the main power supply that controls a power supply to the on-board device D of the hull 101 is in the on state.

The controller 7 performs a control to maintain the stopped state upon the user operating the start switch 31 when the drive command (the forward drive command E2 or the reverse drive command E3) is being input to the input 2 in the stopped state. In such a case, the user is operating the start switch 31, and thus the user conceivably has an intention to change the stopped state to the ready-to-be-driven state. Therefore, the predetermined notification 41b such as "PLEASE SET THE LEVER TO THE NEUTRAL INPUT POSITION" is displayed on the display 41. Thus, the user is able to perform an appropriate operation to change the stopped state to the ready-to-be-driven state.

The controller 7 performs a control to not drive the electric motor 12 regardless of an input to the input 2 upon the user operating the neutral retention switch 5 when the neutral command E1 is being input to the input 2, and the start switch 31 has been operated to switch the marine vessel 100 to the ready-to-be-driven state.

The controller 7 performs a control to return the stopped state to the ready-to-be-driven state upon the user operating the start switch 31 with the clip 61 being reattached to the switch 62 and the neutral command E1 being input to the input 2 when the clip 61 of the emergency stop switch 6 is detached from the switch 62, and the marine vessel 100 is switched to the stopped state by the emergency stop switch 6. That is, the electric motor 12 is not driven only by reattaching the clip 61 to the switch 62.

Figure 7:
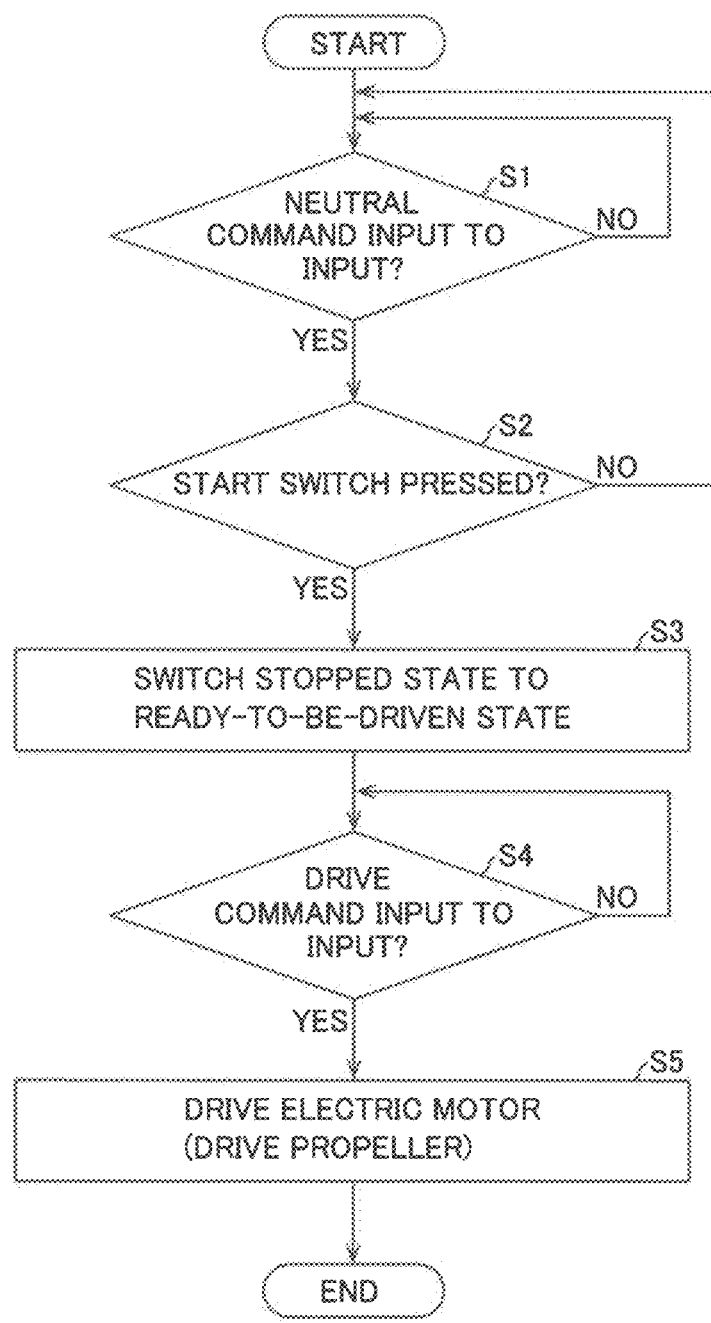
FIG. 7 is a flowchart of a control process executed by a controller according to a preferred embodiment of the present invention to drive a propeller.

A flowchart of a control process performed by the controller 7 to drive the propeller 10 is now described with reference to FIG. 7. The control process performed by the controller 7 to drive the propeller 10 is started when the power switch 30 is operated to turn on the main power supply. At the initial time point at which the power switch 30 is operated to turn on the main power supply, the marine vessel 100 is in the stopped state.

First, in step S1, it is determined whether or not the neutral command E1 is being input to the input 2. That is, it is determined whether or not the lever 20 of the input 2 is at the neutral input position P1 (neutral notch N10). When it is determined in step S1 that the neutral command E1 is being input to the input 2, the process advances to step S2, and when it is determined in step S1 that the neutral command E1 is not being input to the input 2, the process operation in step S1 is repeated. That is, when the drive command (the forward drive command E2 or the reverse drive command E3) is being input to the input 2, the process operation in step S1 is repeated.

Then, in step S2, it is determined whether or not the start switch 31 has been pressed. When it is determined in step S2 that the start switch 31 has been pressed, the process advances to step S3, and when it is determined in step S2 that the start switch 31 has not been pressed, the process returns to step S1.

Then, in step S3, the marine vessel 100 is switched from the stopped state to the ready-to-be-driven state. Then, the process advances to step S4. Driving of the electric motor 12 is not started at the time point at which the marine vessel 100 is switched from the stopped state to the ready-to-be-driven state.

Then, in step S4, it is determined whether or not the drive command (the forward drive command E2 or the reverse drive command E3) is being input to the input 2. When it is determined in step S4 that the drive command (the forward drive command E2 or the reverse drive command E3) is being input to the input 2, the process advances to step S5, and when it is determined in step S4 that the drive command (the forward drive command E2 or the reverse drive command E3) is not being input to the input 2, the process operation in step S4 is repeated.

Then, in step S5, the drive command (the forward drive command E2 or the reverse drive command E3) is transmitted to the marine propulsion unit 1 (motor controller 1a) to drive the electric motor 12, and the propeller 10 is driven by the electric motor 12.

This completes the control process performed by the controller 7 to drive the propeller 10.

According to the various preferred embodiments of the present invention described above, the following advantageous effects are achieved.

According to a preferred embodiment of the present invention, the marine vessel maneuvering system 102 includes the controller 7 configured or programmed to perform a control to switch the stopped state to the ready-to-be-driven state to allow the electric motor 12 to drive the propeller 10 upon the user operating the start switch 31 when the main power supply that controls a power supply to the on-board device D of the hull 101 is in the on state, the neutral command E1 is being input to the input 2, and the marine vessel 100 is in the stopped state. Accordingly, the stopped state is switched to the ready-to-be-driven state in which the electric motor 12 is ready to be driven upon the user operating the start switch 31 when the main power supply that controls a power supply to the on-board device D of the hull 101 is in the on state. Thus, in the marine vessel maneuvering system 102, the user is requested to perform a dedicated operation (an operation on the start switch 31) only to allow driving of the electric motor 12. Consequently, the user recognizes that the electric motor 12 is ready to be driven, and drives the propeller 10 with the electric motor 12 with a clear intention.

According to a preferred embodiment of the present invention, the controller 7 is configured or programmed to perform a control to maintain the stopped state upon the user operating the start switch 31 when the drive command (the forward drive command E2 or the reverse drive command E3) is being input to the input 2 in the stopped state. Accordingly, when the drive command (the forward drive command E2 or the reverse drive command E3) to drive the electric motor 12 is being input to the input 2 in the stopped state in which the electric motor 12 is not driven, the drive command (the forward drive command E2 or the reverse drive command E3) has already been input to the input 2, and thus the stopped state is maintained without switching to the ready-to-be-driven state even when the start switch 31 is operated. Thus, driving of the electric motor 12 is prevented from being started immediately after the start switch 31 is operated. That is, an operation on the input 2, and not an operation on the start switch 31, is the final trigger to drive the electric motor 12.

According to a preferred embodiment of the present invention, the marine vessel maneuvering system 102 further includes the neutral retention switch 5 to receive an operation to maintain the state in which the neutral command E1 is being transmitted to the electric motor 12, and the controller 7 is configured or programmed to perform a control to not drive the electric motor 12 regardless of an input to the input 2 upon the user operating the neutral retention switch 5 when the neutral command E1 is being input to the input 2, and the start switch 31 has been operated to switch the marine vessel 100 to the ready-to-be-driven state. Accordingly, even in the ready-to-be-driven state, the state in which the electric motor 12 is not driven is maintained by the neutral retention switch 5 regardless of an input to the input 2.

According to a preferred embodiment of the present invention, the marine vessel maneuvering system 102 further includes the emergency stop switch 6 to acquire the user's movement that triggers the emergency stop of the propeller 10 and switch the ready-to-be-driven state to the stopped state, and the controller 7 is configured or programmed to perform a control to return the stopped state to the ready-to-be-driven state upon the user operating the start switch 31 with the neutral command E1 being input to the input 2 when the marine vessel 100 is switched to the stopped state by the emergency stop switch 6. Accordingly, the stopped state due to operation of the emergency stop switch 6 is released by operating the start switch 31 when the neutral command E1 is being input to the input 2, and not when the drive command (the forward drive command E2 or the reverse drive command E3) is being input to the input 2. Therefore, the electric motor 12 is prevented from being driven immediately when the stopped state due to operation of the emergency stop switch 6 is released.

According to a preferred embodiment of the present invention, the marine vessel maneuvering system 102 further includes the notifier 4 to notify the user that the marine vessel 100 has changed from the stopped state to the ready-to-be-driven state. Accordingly, the notifier 4 allows the user to easily recognize that the marine vessel 100 has changed from the stopped state to the ready-to-be-driven state.

According to a preferred embodiment of the present invention, the notifier 4 includes the lamp 40 that is off when the marine vessel 100 is in the stopped state and is on when the marine vessel 100 is in the ready-to-be-driven state. Accordingly, the user visually recognizes that the marine vessel 100 has changed from the stopped state to the ready-to-be-driven state. Therefore, the user more easily recognizes that the marine vessel 100 has changed from the stopped state to the ready-to-be-driven state.

According to a preferred embodiment of the present invention, the notifier 4 includes the display 41 to indicate that the marine vessel 100 is in the stopped state or the ready-to-be-driven state. Accordingly, the display 41 allows the user to more reliably acquire information indicating that the marine vessel 100 is in the stopped state or the ready-to-be-driven state.

According to a preferred embodiment of the present invention, the controller 7 is configured or programmed to perform a control to maintain the stopped state upon the user operating the start switch 31 when the drive command (the forward drive command E2 or the reverse drive command E3) is being input to the input 2 in the stopped state, and the display 41 displays the predetermined notification 41b regarding the stopped state when the user operates the start switch 31 but the stopped state is maintained. Accordingly, when the stopped state is maintained although the user operates the start switch 31 with the intention to change the stopped state to the ready-to-be-driven state, the predetermined notification 41b regarding the stopped state is displayed on the display 41 for the user. This predetermined notification 41b allows the user to perform an appropriate operation to change the stopped state to the ready-to-be-driven state.

According to a preferred embodiment of the present invention, the marine vessel maneuvering system 102 further includes the power switch 30 to receive an operation to switch the on and off states of the main power supply, and the operation panel 3 including both the start switch 31 and the power switch 30. Accordingly, the power switch 30 and the start switch 31 are provided on the common operation panel 3, and thus the power switch 30 and the start switch 31 are easily continuously operated when the propeller 10 is to be driven while the main power supply is in the off state. That is, the operability of the marine vessel maneuvering system 102 is improved.

According to a preferred embodiment of the present invention, the start switch 31 receives an operation to switch the ready-to-be-driven state to the stopped state in addition to receiving the operation to switch the stopped state to the ready-to-be-driven state. Accordingly, the start switch 31 receives not only an operation (start operation) to switch the stopped state to the ready-to-be-driven state but also an operation (stop operation) to switch the ready-to-be-driven state to the stopped state. Therefore, the system structure is simplified as compared with a case in which a separate dedicated switch is provided for each of these operations.

According to a preferred embodiment of the present invention, the start switch 31 is a button switch operated by being pressed. Accordingly, the stopped state is easily switched to the ready-to-be-driven state by the start switch 31, which is a button switch.

According to a preferred embodiment of the present invention, when the start switch 31 is operated to switch the stopped state to the ready-to-be-driven state, an input to the input 2 is switched from the neutral command E1 to the drive command (the forward drive command E2 or the reverse drive command E3) such that the electric motor 12 starts driving the propeller 10. Accordingly, the user who operates the start switch 31 operates the input 2 to start driving the propeller 10. That is, the user having a clear intention to drive the propeller 10 with the electric motor 12 operates the input 2 to start driving the propeller 10.

According to a preferred embodiment of the present invention, the input 2 includes the lever 20, and is a remote control lever that switches the position of the lever 20 from the neutral input position P1 at which the neutral command E1 is input to the input 2 to the drive input position (the forward drive input position P2 or the reverse drive input position P3) at which the lever 20 is tilted such that the drive command (the forward drive command E2 or the reverse drive command E3) is input to the input 2, and the remote control lever increases the rotation speed of the electric motor 12 as the tilt angle of the lever 20 increases, and includes the dead zone A1 in which the rotation speed of the electric motor 12 is maintained at zero when the lever 20 is within the predetermined tilt angle range including the neutral input position P1. Accordingly, the dead zone A1 prevents the electric motor 12 from being driven at a low rotation speed at which the thrust of the propeller 10 is hardly obtained even when the electric motor 12 is driven.

According to a preferred embodiment of the present invention, the remote control lever (input 2) includes the neutral notch N10 to stop and hold the lever 20 at the neutral input position P1, and the drive notches N20 and N21 provided at the boundary positions between the dead zone A1 and the sensing regions A2 and A3 corresponding to the drive input positions (the forward drive input position P2 and the reverse drive input position P3) to stop and hold the lever 20 at the drive input positions (the forward drive input position P2 and the reverse drive input position P3) such that the rotation speed of the electric motor 12 becomes the predetermined minimum drive rotation speed. Accordingly, the neutral notch N10 allows the lever 20 to be easily held at the neutral input position P1 such that the rotation speed of the electric motor 12 becomes zero. Furthermore, the drive notches N20 and N21 allow the lever 20 to be easily held at the drive input positions (the forward drive input position P2 and the reverse drive input position P3) such that the rotation speed of the electric motor 12 becomes the minimum drive rotation speed at which the thrust of the propeller 10 is obtained.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

For example, while the marine vessel is preferably an outboard motor boat including the marine propulsion unit installed outside the hull in preferred embodiments described above, the present invention is not restricted to this. In the present invention, the marine vessel may alternatively be an inboard/outboard motor boat or an inboard motor boat.

While the start switch is preferably a button switch operated by being pressed in preferred embodiments described above, the present invention is not restricted to this. In the present invention, the start switch may alternatively be a type of switch such as a lever switch different from a button switch.

While the lamp is preferably integral and unitary with the start switch in preferred embodiments described above, the present invention is not restricted to this. In the present invention, the start switch and the lamp may alternatively be separate from each other.

While the notifier preferably includes the lamp and the display in preferred embodiments described above, the present invention is not restricted to this. In the present invention, the notifier may alternatively include an informing device that emits a sound, for example.

While the marine vessel maneuvering system preferably includes the neutral retention switch in preferred embodiments described above, the present invention is not restricted to this. In the present invention, the marine vessel maneuvering system may not include the neutral retention switch.

While the marine propulsion unit preferably includes only the electric motor as a drive source of the propeller in preferred embodiments described above, the present invention is not restricted to this. In the present invention, the marine propulsion unit may alternatively include not only the electric motor but also an engine as a drive source of the propeller.

While the power switch and the start switch are preferably provided on the common operation panel in preferred embodiments described above, the present invention is not restricted to this. In the present invention, the power switch and the start switch may alternatively be provided on separate operation panels.

While the input is preferably a remote control lever in preferred embodiments described above, the present invention is not restricted to this. In the present invention, the input may alternatively be a device different from a remote control lever, such as a joystick or an operation panel including a plurality of operation buttons.

While only one marine propulsion unit is preferably installed on the hull in preferred embodiments described above, the present invention is not restricted to this. In the present invention, a plurality of marine propulsion units may alternatively be installed on the hull.

While the controller is preferably provided in the hull in preferred embodiments described above, the present invention is not restricted to this. In the present invention, the controller may alternatively be provided inside the marine propulsion unit.

While the process operations performed by the controller are described using a flowchart in a flow-driven manner in which processes are performed in order along a process flow for the convenience of illustration in preferred embodiments described above, the present invention is not restricted to this. In the present invention, the process operations performed by the controller may alternatively be performed in an event-driven manner in which the processes are performed on an event basis. In this case, the process operations performed by the controller may be performed in a complete event-driven manner or in a combination of an event-driven manner and a flow-driven manner.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine vessel maneuvering system comprising:
    a marine propulsion unit including an electric motor to drive a propeller;
    an input to input a neutral command to stop the electric motor and to input a drive command to drive the electric motor;
    a start switch to receive an operation to switch a stopped state in which the electric motor is not driven to a ready-to-be-driven state in which the electric motor is ready to be driven;
    a controller configured or programmed to perform a control to switch the stopped state to the ready-to-be-driven state to allow the electric motor to drive the propeller upon a user operating the start switch when a main power supply that controls a power supply to an on-board device of a hull is in an on state, the neutral command is being input to the input, and a marine vessel is in the stopped state; and
    a power switch separate from the start switch to receive an operation to switch on and off states of the main power supply; wherein
    the start switch receives an operation to switch the ready-to-be-driven state to the stopped state and maintain the stopped state while the main power remains in the on state, in addition to receiving the operation to switch the stopped state to the ready-to-be-driven state.

2. The marine vessel maneuvering system according to claim 1, wherein the controller is configured or programmed to perform a control to maintain the stopped state upon the user operating the start switch when the drive command is being input to the input in the stopped state.

3. The marine vessel maneuvering system according to claim 1, further comprising:
    a neutral retention switch to receive an operation to maintain a state in which the neutral command is being transmitted to the electric motor; wherein
    the controller is configured or programmed to perform a control to not drive the electric motor regardless of an input to the input upon the user operating the neutral retention switch when the neutral command is being input to the input, and the start switch has been operated to switch the marine vessel to the ready-to-be-driven state.

4. The marine vessel maneuvering system according to claim 1, further comprising:
    an emergency stop switch to acquire a movement of the user that triggers an emergency stop of the propeller and switch the ready-to-be-driven state to the stopped state; wherein
    the controller is configured or programmed to perform a control to return the stopped state to the ready-to-be-driven state upon the user operating the start switch with the neutral command being input to the input when the marine vessel is switched to the stopped state by the emergency stop switch.

5. The marine vessel maneuvering system according to claim 1, further comprising:
a notifier to notify the user that the marine vessel has changed from the stopped state to the ready-to-be-driven state.

6. The marine vessel maneuvering system according to claim 5, wherein the notifier includes a lamp that is off when the marine vessel is in the stopped state and is on when the marine vessel is in the ready-to-be-driven state.

7. The marine vessel maneuvering system according to claim 5, wherein the notifier includes a display to indicate that the marine vessel is in the stopped state or the ready-to-be-driven state.

8. The marine vessel maneuvering system according to claim 7, wherein
the controller is configured or programmed to perform a control to maintain the stopped state upon the user operating the start switch when the drive command is being input to the input in the stopped state; and
the display is operable to display a predetermined notification regarding the stopped state when the user operates the start switch but the stopped state is maintained.

9. The marine vessel maneuvering system according to claim 1, further comprising:
an operation panel including both the start switch and the power switch.

10. The marine vessel maneuvering system according to claim 1, wherein the start switch is a button switch operated by being pressed.

11. The marine vessel maneuvering system according to claim 1, wherein, when the start switch is operated to switch the stopped state to the ready-to-be-driven state, an input to the input is switched from the neutral command to the drive command such that the electric motor starts driving the propeller.

12. The marine vessel maneuvering system according to claim 1, wherein
the input includes a remote control lever to switch a position of the remote control lever from a neutral input position at which the neutral command is input to the input to a drive input position at which the remote control lever is tilted such that the drive command is input to the input; and
the remote control lever increases a rotation speed of the electric motor as a tilt angle of the remote control lever increases, and includes a dead zone in which the rotation speed of the electric motor is maintained at zero when the remote control lever is within a predetermined tilt angle range including the neutral input position.

13. The marine vessel maneuvering system according to claim 12, wherein the remote control lever includes a neutral notch to stop and hold the remote control lever at the neutral input position, and a drive notch at a boundary position between the dead zone and a sensing region corresponding to the drive input position to stop and hold the remote control lever at the drive input position such that the rotation speed of the electric motor becomes a predetermined minimum drive rotation speed.

14. A marine vessel comprising:
a hull; and
a marine vessel maneuvering system mounted on the hull and including:
a marine propulsion unit including an electric motor to drive a propeller;
an input to input a neutral command to stop the electric motor and to input a drive command to drive the electric motor;
a start switch to receive an operation to switch a stopped state in which the electric motor is not driven to a ready-to-be-driven state in which the electric motor is ready to be driven;
a controller configured or programmed to perform a control to switch the stopped state to the ready-to-be-driven state to allow the electric motor to drive the propeller upon a user operating the start switch when a main power supply that controls a power supply to an on-board device of the hull is in an on state, the neutral command is being input to the input, and the marine vessel is in the stopped state; and
a power switch separate from the start switch to receive an operation to switch on and off states of the main power supply; wherein
the start switch receives an operation to switch the ready-to-be-driven state to the stopped state and maintain the stopped state while the main power remains in the on state, in addition to receiving the operation to switch the stopped state to the ready-to-be-driven state.

15. The marine vessel according to claim 14, wherein the controller is configured or programmed to perform a control to maintain the stopped state upon the user operating the start switch when the drive command is being input to the input in the stopped state.

16. The marine vessel according to claim 14, wherein
the marine vessel maneuvering system further includes a neutral retention switch to receive an operation to maintain a state in which the neutral command is being transmitted to the electric motor; and
the controller is configured or programmed to perform a control to not drive the electric motor regardless of an input to the input upon the user operating the neutral retention switch when the neutral command is being input to the input, and the start switch has been operated to switch the marine vessel to the ready-to-be-driven state.

17. The marine vessel according to claim 14, wherein
the marine vessel maneuvering system further includes an emergency stop switch to acquire a movement of the user that triggers an emergency stop of the propeller and switch the ready-to-be-driven state to the stopped state; and
the controller is configured or programmed to perform a control to return the stopped state to the ready-to-be-driven state upon the user operating the start switch with the neutral command being input to the input when the marine vessel is switched to the stopped state by the emergency stop switch.

18. The marine vessel according to claim 14, wherein the marine vessel maneuvering system further includes a notifier to notify the user that the marine vessel has changed from the stopped state to the ready-to-be-driven state.

19. The marine vessel according to claim 18, wherein the notifier includes a lamp that is off when the marine vessel is in the stopped state and is on when the marine vessel is in the ready-to-be-driven state.

* * * * *